Dec. 11, 1945.   D. R. CLEMONS   2,390,776
METHOD OF MOUNTING ELECTRICAL CONDENSERS
Original Filed Oct. 24, 1941   2 Sheets-Sheet 1
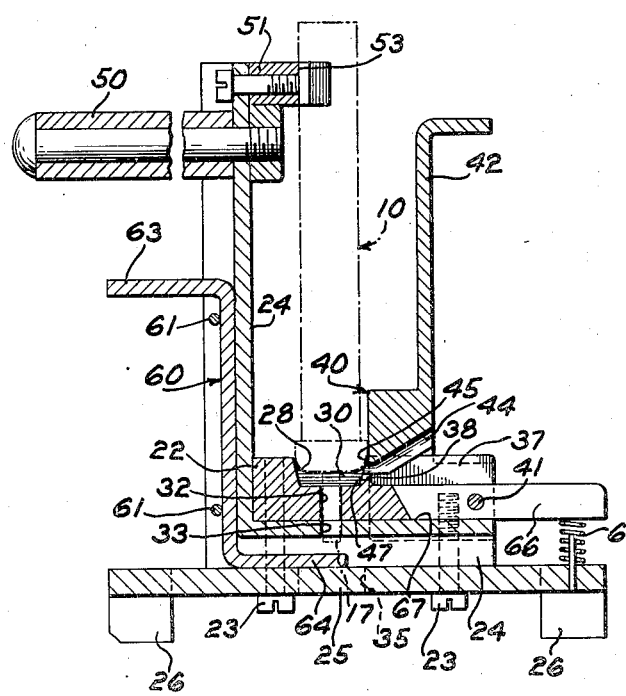
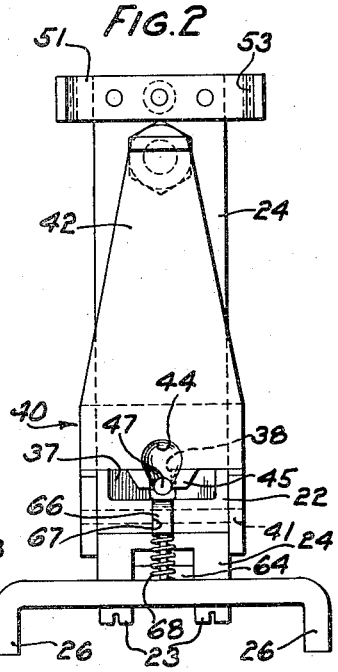
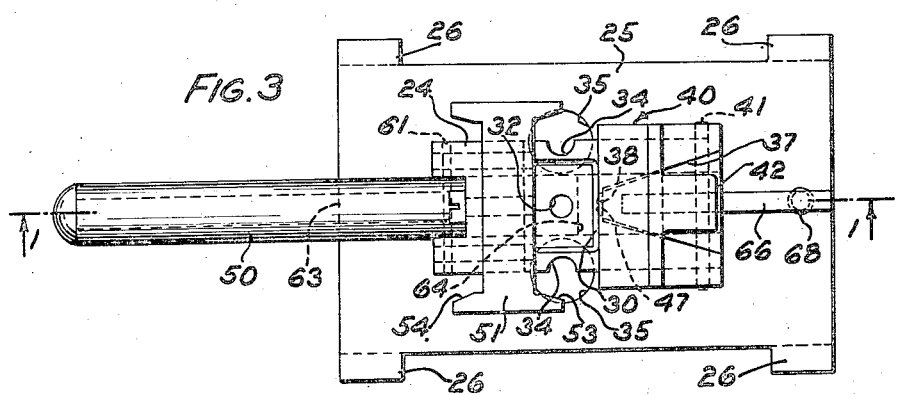
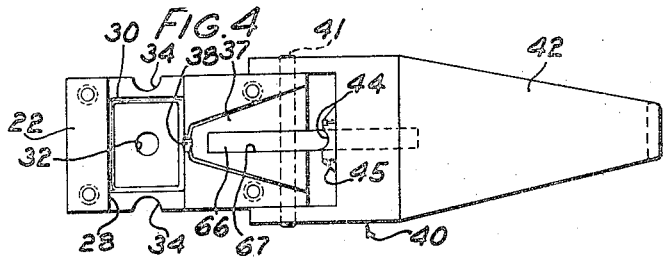
INVENTOR.
D. R. CLEMONS
BY
ATTORNEY Dec. 11, 1945. D. R. CLEMONS 2,390,776
METHOD OF MOUNTING ELECTRICAL CONDENSERS
Original Filed Oct. 24, 1941 2 Sheets-Sheet 2
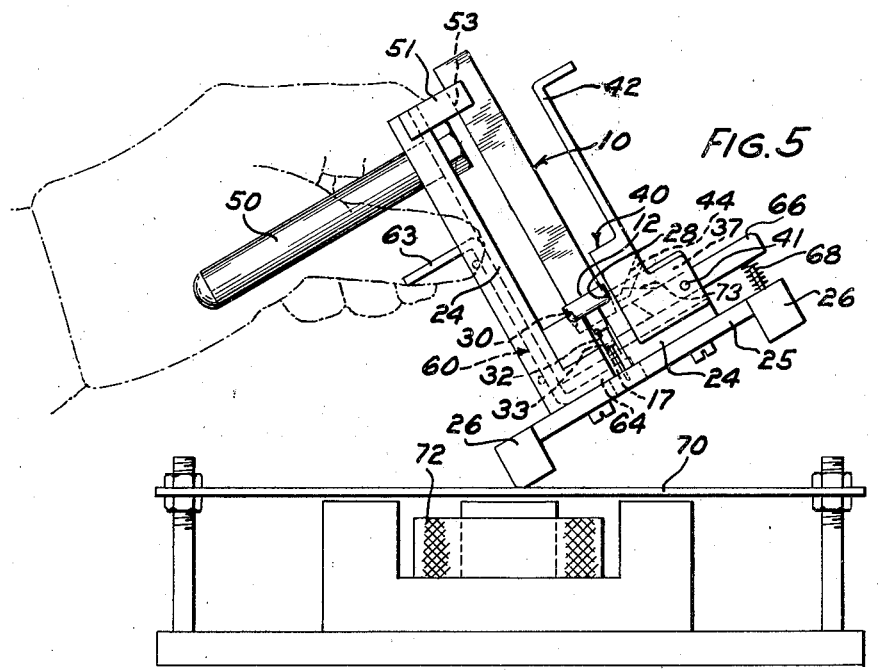
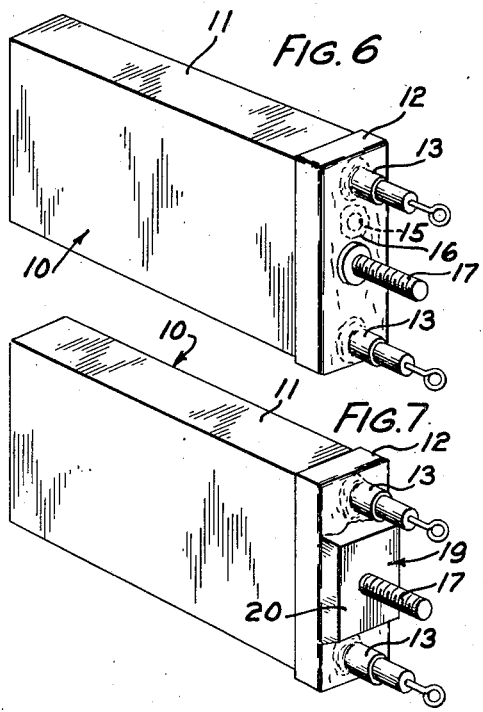
INVENTOR.
D. R. CLEMONS
BY
ATTORNEY Patented Dec. 11, 1945

2,390,776

UNITED STATES PATENT OFFICE 2,390,776

METHOD OF MOUNTING ELECTRICAL CONDENSERS

Dale R. Clemons, Riverside, Ill., assignor to Western Electric Company, Incorporated, New York, N. Y., a corporation of New York Original application October 24, 1941, Serial No. 416,287. Divided and this application March 12, 1943, Serial No. 478,893

2 Claims. (Cl. 29—25.42)

This invention relates to a method of mounting electrical condensers and the like, and is a division of my copending application, Serial No. 416,287, filed October 24, 1941.

Electrical condensers, particularly those of the type which are sealed in metal containers, are sometimes attached to flat supporting members or mounting plates by means of mounting studs which are anchored in the sealed covers of the condenser containers and project perpendicularly therefrom. It is essential, in some instances, that such condensers be accurately aligned with respect to the supporting member or mounting plate to present a pleasing appearance and/or to permit the mounting of a plurality of condensers on close centers. However, the presence of the usual soldered terminal posts and soldered filling holes on the condenser covers usually present irregular surfaces surrounding the mounting studs which, heretofore, has rendered it difficult and costly to properly align such condensers with respect to the mounting plates.

An object of the present invention is to provide an improved method of mounting electrical condensers and the like, whereby the above mentioned objections are eliminated.

In accordance with the above object, one embodiment of the invention contemplates the provision of a method of mounting an electrical condenser on a flat surfaced support, in which a flat surfaced mounting block or embossment is molded or cast directly on the condenser, after which the condenser is attached to the support with the flat surface of the embossment contacting and flush with the flat surface of the support.

A more complete undertsanding of the method of the present invention may be had from the following detailed description when read in conjunction with the accompanying drawings, in which Fig. 1 is a vertical sectional view of a molding fixture by means of which the method may be practiced, the section being taken on line 1—1 of Fig. 3;

Fig. 2 is a side elevational view of the fixture;

Fig. 3 is a plan view thereof;

Fig. 4 is a plan view of the mold and gate member, the latter being shown in the open position;

Fig. 5 is a front elevational view showing the manner in which the fixture is held in a tilted position upon an electromagnetically vibrated plate during the pouring of the molten metal into the mold cavity;

Fig. 6 is a perspective view of an electrical condenser adapted to be provided with a cast mounting block by the method of the present invention;

Fig. 7 is a perspective view of an electrical condenser that has been provided with a cast mounting block by the method of the invention; and Fig. 8 shows several such condensers attached to a mounting plate.

Referring now to the drawings, there is illustrated in Fig. 6 an electrical condenser 10 of a well known type employed in telephone communication systems. The illustrated condenser comprises an outer metal casing or container 11 having a sealed-on cover 12 to which are soldered the two terminal posts 13—13. The cover is provided with the usual filling hole 15 which is sealed by a globule of solder 16. A mounting stud 17 is anchored to the cover for use in attaching the condenser to a supporting panel or mounting plate 18, as shown in Fig. 8.

In accordance with a feature of the present invention, a flat surfaced embossment or mounting block 19 (Fig. 7) is molded or cast directly on the cover, adjacent to and surrounding the mounting stud 17. This mounting block is preferably composed of a lead-antimony-tin alloy, but other alloys, as well as various non-metallic molding materials, may be used. It is necessary, only, that the mounting block be firmly attached to the condenser cover and that it have a flat outer surface 20 for engaging and cooperating with the mounting plate to maintain the condenser substantially perpendicular to the mounting plate, as shown in Fig. 8.

A preferred form of molding fixture for casting the molding block on the condenser cover is illustrated in Figs. 1 to 5, inclusive, of the drawings. It comprises a mold block 22 which is removably attached by screws 23 to the base of an L-shaped frame 24, the latter being attached by the same screws to a supporting plate 25. This plate has four downwardly turned flanges 26, 26 which serve as supporting legs for the fixture when placed on a table or work bench.

The condenser is placed in the molding fixture in an inverted position, as shown in broken lines in Fig. 1, and it will be noted that the mold block 22 of the fixture is formed on its upper surface with a depression 28 which conforms to and accommodates the cover of the condenser. Within this depression and centered with respect thereto is a mold cavity 30 (Figs. 1 and 4) which is shaped to conform to the shape of the embossment or mounting block to be cast on the condenser cover, and the bottom of the mold cavity is flat so as to form a flat mounting surface on the cast mounting block.

Mold block 22 and supporting frame 24 are provided with aligned close fitting apertures 32 and 33, respectively, for accommodating the mounting stud 17 of the condenser. Notches 34, 34 (Figs. 3 and 4) are provided in the mold block and frame for accommodating the terminal posts 13 of the condenser and two apertures 35—35 are provided in the base plate 25 for receiving the condenser terminals.

To the right of the mold cavity 30, a tapered depression or filling trough 37 is provided in the upper surface of the mold block and a slot 38 in the adjoining wall of the mold cavity connects the cavity with the trough.

A gate member 40 is hinged or pivoted on the protruding ends of a fixed horizontal pin 41 mounted in the mold block. This gate member is provided with a suitable handle 42 by means of which it may be opened and closed. The gate is formed with a tapered groove 44 which terminates at its smaller end in a slotted projection 45. When the gate is closed, as shown in Figs. 1, 2 and 3, the slotted projection 45 cooperates with the slotted wall of the mold cavity to provide an inlet opening 47 (Fig. 2) for the mold cavity, and it will be obvious that the tapered groove 44 of the gage is adapted to cooperate with the tapered depression 37 in the mold block to guide and direct the molten metal toward the inlet opening 47.

To the upper end of the upstanding portion of frame 24, there is attached a suitable handle 50 and a channeled guide or gauge block 51. The gauge block is provided on opposite sides thereof with two guide channels 53 and 54 for accommodating the body portion of the condenser and these guide channels are of different widths so that by simply reversing the gauge block, the fixture may be adjusted to handle condensers of two different sizes.

The frame 24 is of channel cross section and an ejecting bar 60 is vertically slidable therein behind fixed retaining pins 61—61, as best shown in Fig. 1. This ejecting bar has a horizontal outwardly extending handle portion 63 at its upper end and a horizontal inwardly extending arm 64 at its lower end. When the ejecting bar is manually lifted by means of the handle portion 63, the arm 64 is adapted to press upwardly on the stud 17 of the condenser to lift the condenser out of the mold.

An auxiliary ejector in the form of a lever 66 is provided for cooperating with ejecting bar 60 to remove the condenser and the attached cast mounting block from the mold. This ejector lever is pivoted on the horizontal pin 41 and operates in a slot 67 in the mold block. A coil spring 68 is arranged to press upwardly against the outer end of the lever so that the inner end thereof is normally held in its retracted position within the slot 67. When in this position, the upper surface of the lever is flush with the bottom of the filling trough 37 of the mold block.

In the operation of the above described molding fixture, a condenser is placed therein in an inverted position, as shown in broken lines in Fig. 1, with the mounting stud 17 inserted in the apertures 32 and 33 and with the body of the condenser lying in the channel 53 of gauge block 51. The condenser is thus positioned perpendicular to the flat bottom surface of the mold cavity 30. With the condenser so positioned, the gate 40 is closed and the fixture is held in a tilted position upon a vibratory plate 70, as shown in Fig. 5. By means of an electromagnet 72, the plate is vibrated while molten metal is poured into the mold cavity through the inlet opening 47 by way of the filling trough 37. The fixture is vibrated by the vibrating plate, thus forcing the molten metal into all corners of the mold cavity.

A sufficient amount of molten metal is poured into the mold to completely fill the mold cavity and then rise in the filling trough 37 to the level indicated at 73 in Fig. 5. After the metal in the mold has been allowed to "set," the fixture is removed from the vibrating plate, the gate 40 is opened, and the condenser with the block of metal cast thereon is ejected from the fixture. The ejection is accomplished by manually lifting the ejector bar 60 to lift the condenser and cast block out of the mold while the outer end of ejector lever 66 is pressed downwardly so that the inner end thereof is projected upwardly to eject from the filling trough 37 the protruding burr formed on the cast block by the overflow of metal into the filling trough. This protruding burr is then removed by clipping it off with close cutting pliers, thus leaving attached to the condenser cover a cast mounting block 19 (Fig. 7) having smooth side edges and a flat surface 20 for engaging and cooperating with the mounting plate to maintain the condenser perpendicular with respect to the mounting plate, as shown in Fig. 8.

It will be obvious that the invention is not limited to the specific embodiment thereof herein illustrated and described, but is capable of other applications within the scope of the appended claims.

What is claimed is:

1. A method of making an electrical device having a flat mounting surface thereon, which comprises placing an electrical unit in a container, securing a closure member to the container and molding directly on said closure member a mounting block having a flat molded surface.

2. A method of making an electrical device having a flat mounting surface thereon, which comprises placing an electrical unit in a container having substantially parallel side walls and an open end, securing a closure member to said open end, and molding directly on said closure member a mounting block having a flat moulded mounting surface substantially perpendicular to said side walls.

DALE R. CLEMONS.